United States Patent
Imura et al.

(10) Patent No.: US 7,197,687 B2
(45) Date of Patent: Mar. 27, 2007

(54) HEADER COMPRESSED PACKET RECEIVING APPARATUS AND METHOD

(75) Inventors: Koji Imura, Machida (JP); Daiji Ido, Yokohama (JP); Akihiro Miyazaki, Sakai (JP); Koichi Hata, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 601 days.

(21) Appl. No.: 10/466,251

(22) PCT Filed: Sep. 19, 2002

(86) PCT No.: PCT/JP02/09599

§ 371 (c)(1),
(2), (4) Date: Jul. 15, 2003

(87) PCT Pub. No.: WO03/030435

PCT Pub. Date: Apr. 10, 2003

(65) Prior Publication Data

US 2004/0088642 A1    May 6, 2004

(30) Foreign Application Priority Data

Sep. 28, 2001 (JP) .............................. 2001-301846

(51) Int. Cl.
H03M 13/39 (2006.01)
(52) U.S. Cl. ....................... 714/776; 370/394
(58) Field of Classification Search ................ 370/394; 714/776; H03M 13/39
See application file for complete search history.

(56) References Cited

U.S. PATENT DOCUMENTS 6,385,199 B2    5/2002    Yoshimura et al.

2003/0016627 A1*   1/2003  MeLampy et al. .......... 370/394
2004/0136376 A1*   7/2004  Einamo ....................... 370/394

FOREIGN PATENT DOCUMENTS

| EP | 1081910 | 3/2001 |
|----|---------|--------|
| EP | 1122925 | 8/2001 |
| EP | 1146713 | 10/2001 |
| EP | 1180871 | 2/2002 |
| EP | 1187416 | 3/2002 |

(Continued)

OTHER PUBLICATIONS

Japanese Office Action dated Aug. 17, 2004 with English translation.

(Continued)

Primary Examiner—R. Stephen Dildine
(74) Attorney, Agent, or Firm—Stevens, Davis, Miller & Mosher, LLP

(57) ABSTRACT

When an error is detected in a received header, in estimating reference information while assuming an error in a packet receiving interval, a header is decompressed using at least one value of another candidate sequence numbers used in correcting an erroneous sequence number, corresponding to a time that elapses between previously receiving a packet correctly and receiving a current packet and to the packet receiving internal. It is thereby possible to increase a possibility of estimating the reference information correctly and suppress the number of discarded packets at a receiving side, while suppressing increases in introduced processing amount in data transmission with header compression.

12 Claims, 8 Drawing Sheets

FOREIGN PATENT DOCUMENTS

| | | |
|---|---|---|
| EP | 1191760 | 3/2002 |
| JP | 2001223748 | 8/2001 |
| JP | 2001244993 | 9/2001 |
| JP | 2001320419 | 11/2001 |
| JP | 2001320422 | 11/2001 |
| JP | 2002026963 | 1/2002 |
| JP | 2002094554 | 3/2002 |
| JP | 2002135362 | 5/2002 |
| JP | 2002141968 | 5/2002 |
| JP | 2002158739 | 5/2002 |
| JP | 2002290383 | 10/2002 |
| JP | 2002344429 | 11/2002 |
| WO | 0060795 | 10/2000 |
| WO | 0079763 | 12/2000 |
| WO | 0128180 A2 | 4/2001 |
| WO | 0167709 | 9/2001 |

OTHER PUBLICATIONS

Supplementary European Search Report dated Jun. 15, 2004.
International Search Report dated Dec. 17, 2002.
C. Bormann, et al.: "Robust Header Compression (ROHC): Framework and four profiles: RTP, UDP, ESP and uncompressed" The Internet Society, Jul. 2001, pp. 1-157, http://www.rfc-editor.org/rfc/rfc3095.txt.

* cited by examiner

HEADER COMPRESSED PACKET RECEIVING APPARATUS AND METHOD

TECHNICAL FIELD

The present invention relates to a header compressed packet receiving apparatus and method, and more particularly, to a header compressed packet receiving apparatus and method in techniques for compressing header information assigned in each protocol to transmit in transmitting transmission data using a plurality of transmission protocols.

BACKGROUND ART

Among protocols (communication procedures) used in transmitting data are Internet Protocol (IP), User Data Protocol (UDP:RFC768) and Real Time Transport Protocol (RTP:RFC1889), and in data transmission it is general to combine these protocols to use. These protocols are standardized by an organization called IETF (Internet Engineering Task Force).

These protocols have different roles in data transmission. IP assigns an address on the internet. UDP assigns a port number in a terminal and error detecting code to detect whether data has an error in its contents. RTP assigns time information (Time Stamp: hereinafter abbreviated as TS) on transmission data and sequence number (hereinafter abbreviated as SN) of the data. In data transmission, as illustrated in FIG. 1, header information to be assigned in each protocol is added to the data.

Specifically, TS/SN is added to a payload in RTP packetizing processing, a port number is added to the RTP packet in UDP packetizing processing, and an IP address is added to the UDP packet in IP packetizing processing.

Among header information added to a payload, there is some kind of information that does not need to be transmitted always and is enough to be transmitted once or at times. When a method is used where such header information is transmitted once only for the first time and is not transmitted subsequently, or is transmitted only at proper timing, the transmission efficiency is improved. Such a technique is called a header compression technique. In particular, compression of IP/UDP/RTP headers is recommended as RFC2508 in IETF.

Further, there is a technique which has transmission error resistance, increases a compression rate as compared to the conventional header compression, and is called a robust header compression technique. These methods have been proposed in IETF. In the robust header technique, the compression is implemented by a method as described below.

Data such as an IP address and port number that is constant during communications is transmitted only for the first time, whereby a subsequent data amount is reduced.

With respect to TS, when the correlation with increases in SN is high, only SN is transmitted, and TS is calculated from an increase amount of SN of a last arrived packet, whereby the data amount of the header is further reduced.

With respect to SN, only insignificant bits are transmitted instead of transmitting all the bits each time, and when a carry occurs to a significant bit, all SN is transmitted.

In this way, in the robust header compression, a header of received data is decompressed referring to the header information of a previously transmitted packet. The information thus referred to is called reference information.

In order to implement header compression as described above, two header types (IR: Initial Refresh IR-DYN: IR-Dynamic) are prepared. Each header type is shown in FIG. 2. Almost the header types contain error detecting code (CRC: Cyclic Redundancy Check), and a receiving side is capable of checking whether the decompressed header is correct.

IR is a header type (including CID, profile, CRC, static chain and optional dynamic chain) for transmitting constant information as described above, and is often transmitted at the time of starting communications. IR-DYN is a header type for transmitting information (for example, TS and SN in RTP and check sum in UDP) that varies dynamically without compressing, and is transmitted to re-acquire synchronization when the reference information is not coincident between a transmitting side and receiving side, for example, due to transmission error. The compressed packet is a header type for compressing information that varies dynamically based on the reference information to transmit.

There are some types of compressed packets. Principal types are three as described below. Type 0 is a header composed of 1 byte including insignificant 4 bits of SN and CRC, and has the highest compression rate. Type 1 is a header composed of 2 bytes including insignificant 4 bits of SN, insignificant 6 bits of TS and CRC, and is used when the time information changes. Type 2 is a header composed of 3 bytes including insignificant 6 bits of SN, insignificant 5 bits and CRC.

Since a code indicative of a type of the header is assigned to a beginning of each header, the receiving side is capable of identifying the header uniquely. In FIG. 2, CID in IR is called a context ID, and is an ID assigned individually to a packet transmitted on a single channel. The profile is information indicative of a header to be compressed. Static chain is the constant information as described previously. For example, when D is 1, it is possible to transmit a dynamic chain as an option.

IR-DYN is the same as IR except the dynamic chain, where the information that varies dynamically is transmitted. M in types 1 to 2 is a marker bit contained in an RTP packet header. The bit is a flag which is "1" in a packet containing a last unit (1 frame when data is an image) of some meaning of media data. X indicates the presence or absence of expansion information. Bit sequences of "0" and "1" except the foregoing are determined in the specification indicating a type of the packet. In addition, while the number of bits of each element varies in the specification with used mode, brief descriptions are given herein.

Specific transmission procedures with no transmission error occurring will be described below with reference to FIG. 3. Specific descriptions to understand a general idea of the header compression are omitted herein.

In FIG. 3, IR is first transmitted, so that the transmitting side shares reference information with the receiving side. In second transmission, IR-DYN is transmitted, so that the transmitting side shares dynamically varying information with the receiving side. In third transmission, in order to transmit a header with SN of 1 (SN=1), only insignificant 4 bits of SN are transmitted using type 0. The receiving side decompresses received SN with the insignificant 4 bits into original SN with 2 bytes, and decompresses SN to TS (it is herein assumed that TS is decompressed from SN readily using the linear relationship between SN and TS)

It is checked whether the header of the received packet has an error from the decomposed header and received CRC. The header with no error is considered as being received correctly, and is provided to the upper protocol layer (IP).

Subsequently, the transmitting side transmits packets respectively with SN of 2 to 15 in similar procedures, while the receiving side receives the packet in similar procedures.

When SN is 16 (SN=16), type 0 of packet is insufficient in the number of bits of SN to transmit, and therefore, cannot transmit SN. Thus exceeding a range to represent due to a small number of bits is called wraparound. When the wraparound occurs, type 2 is selected and transmitted which is a header type enabling transmission of 6 bits of SN. The receiving side decompresses insignificant 6 bits of SN to entire SN of 2 bytes.

A case where a transmission error occurs will be described with reference to FIG. 4. FIG. 4 illustrates the case where the procedures is the same as in FIG. 3 and a transmission error occurs in SN of 5 (SN=5). When an error occurs in the header with SN of 5, performing CRC on the decompressed header detects an error.

In this case, the packet containing the header is discarded. In a subsequent packet with SN of 6 (SN=6), the header is decompressed using the reference information of the header with SN of 4, since the reference information of the header with SN of 4 does not differ from the reference information of the header with SN of 5, the header of the packet with SN of 6 can be decompressed accurately. In other words, even when a middle packet is lost due to the error, as long as the reference information is not updated, it only happens that the error packet is discarded, and the effects are not imposed on subsequent packets. It is thereby possible to implement header compression with resistance to error.

As described above, with respect to a packet loss when the reference information does not change, effects of an error does not propagate, while effects of an error propagate when the error occurs in a packet where the wraparound occurs.

FIG. 5 illustrates an error with respect to a packet where the wraparound occurs. FIG. 5 shows the same transmission and reception procedures as in FIG. 3, and illustrates a case where an error occurs in a packet with SN of 16 where the wraparound occurs. In this case, since next SN of 17 is transmitted in type 0 of packet, only significant 4 bits of SN are transmitted. Since SN of 16 is discarded, the receiving side tries to decompress SN using the reference information at the time of receiving SN of 15.

The reference information of significant bits of SN should be "0000 0000 0001" normally at the time of receiving SN of 16, but is lost due to the error, and is still "0000 0000 0000". Since insignificant 4 bits of SN of 17 are "0001", decompressed SN becomes "0000 0000 0000 0001" i.e. "1". Since "17" should be decompressed originally, in this case CRC detects an error, despite a packet with SN of 17 being received properly. In such a case, the receiving side understands that the wraparound occurs, and is capable of performing decompression on the assumption that significant bits that is the reference information of SN are "0000 0000 0001". There is a case that such processing on the receiving side enables decompression.

The above example describes the case where a single packet with the wraparound generated therein is lost, but actually, it sometimes happens that depending on transmission path conditions, packets does not reach the receiving side temporarily, and a plurality of successive packets is lost. The receiving side assumes the number of times the wraparound has occurred to perform decompression. In other words, the receiving side estimates the number of times the wraparound has occurred from the time (hereinafter referred to as an elapsed time) which elapses between a correctly received last packet and a current packet, and assumes significant bits that is the reference information of SN to decompress.

As the method of estimating the number of times the wraparound has occurred, the number of received packets is estimated from the elapsed time and packet receiving interval, and further, the reference information is estimated to perform decompression. This method is effective when the packet receiving interval is constant, but when the packet receiving interval varies and the elapsed time is increased, the error is increased and it is not possible to estimate correct reference information, resulting in a problem that a possibility of decompressing a received packet correctly becomes extremely low.

For example, when a packet receiving interval that a receiving side recognizes is 10 ms and an elapsed time is 1 second, hundred packets are received during the elapsed time. Since the wraparound occurs once every 16 times, in this case it is judged that the wraparound has occurred 6 times (100/16=6.25). FIG. 6 illustrates such a situation.

However, when the actual packet receiving interval is 11 ms, about ninety packets are received, in this case the number of wraparound times is 5 (90/16=5.625) which differs from the number of wraparound times estimated by the receiving side, and since it is not possible to estimate correct reference information, there is a problem that the possibility of decompressing a received packet correctly becomes extremely low.

DISCLOSURE OF INVENTION

It is an object of the present invention to provide a header compressed packet receiving apparatus and method capable of increasing a possibility of decompressing a received packet correctly, and suppressing the number of discarded packets, while suppressing increases in introduced processing amount in data transmission with header compression.

The object is achieved by calculating the number of candidate sequence numbers used in correcting a packet corresponding to a packet receiving interval and the time (elapsed time) which elapses between last receiving a correct packet and receiving a current packet that has an error when a header has the error, decompressing headers corresponding to the calculated number of sequence numbers, performing error detection on each of the decompressed headers, and when finding only a single header with no error, decompressing the received packet using the header.

BEST MODE FOR CARRYING OUT THE INVENTION

An embodiment of the present invention will be described below with reference to accompanying drawings.

Figure 1:
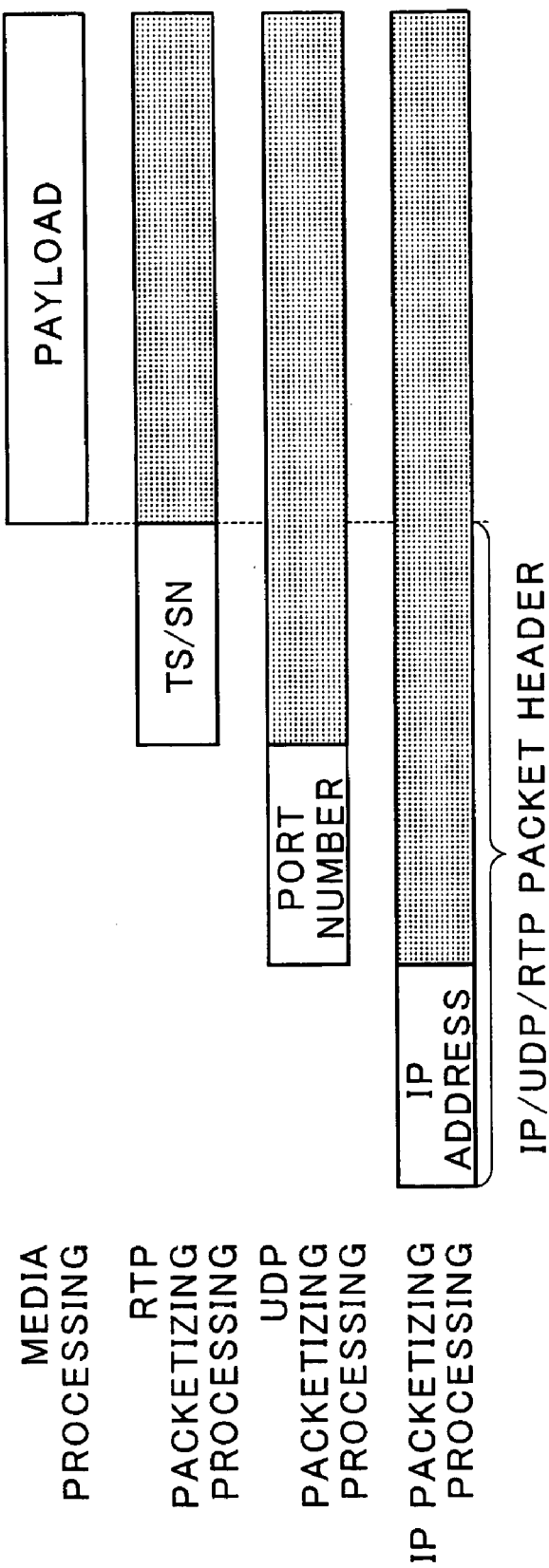
FIG. 1 is a diagram illustrating a configuration of packet data.
Figure 2:
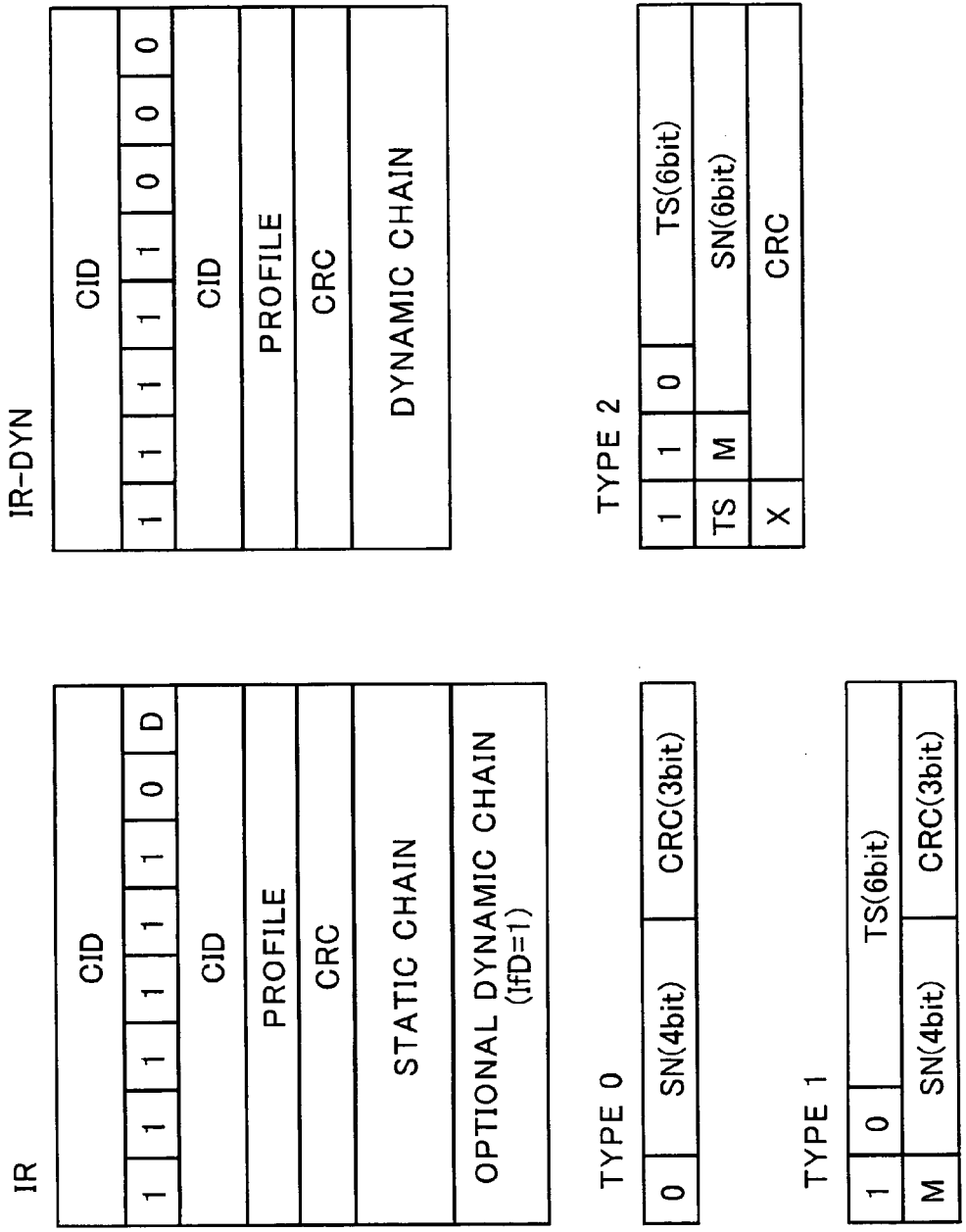
FIG. 2 is a diagram illustrating types of packets in robust header compression.
Figure 3:
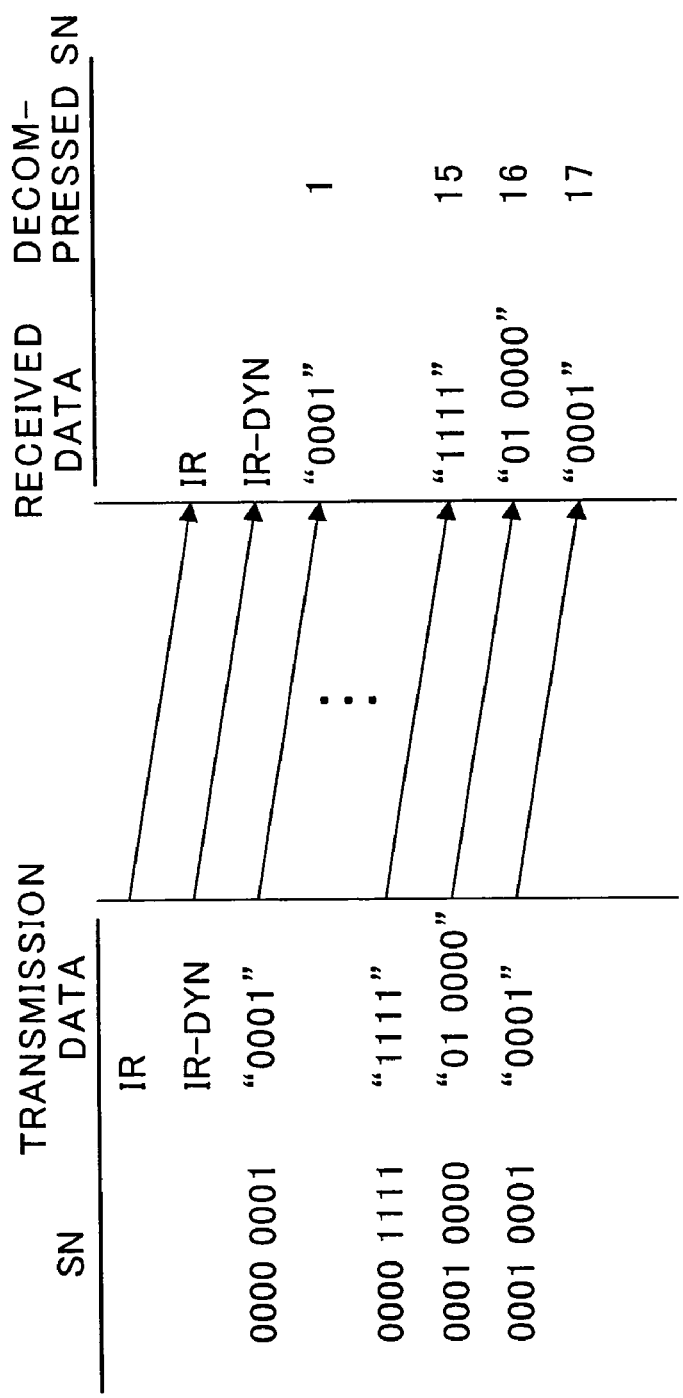
FIG. 3 is a sequence diagram illustrating data transmission with no transmission error in robust header compression.
Figure 4:
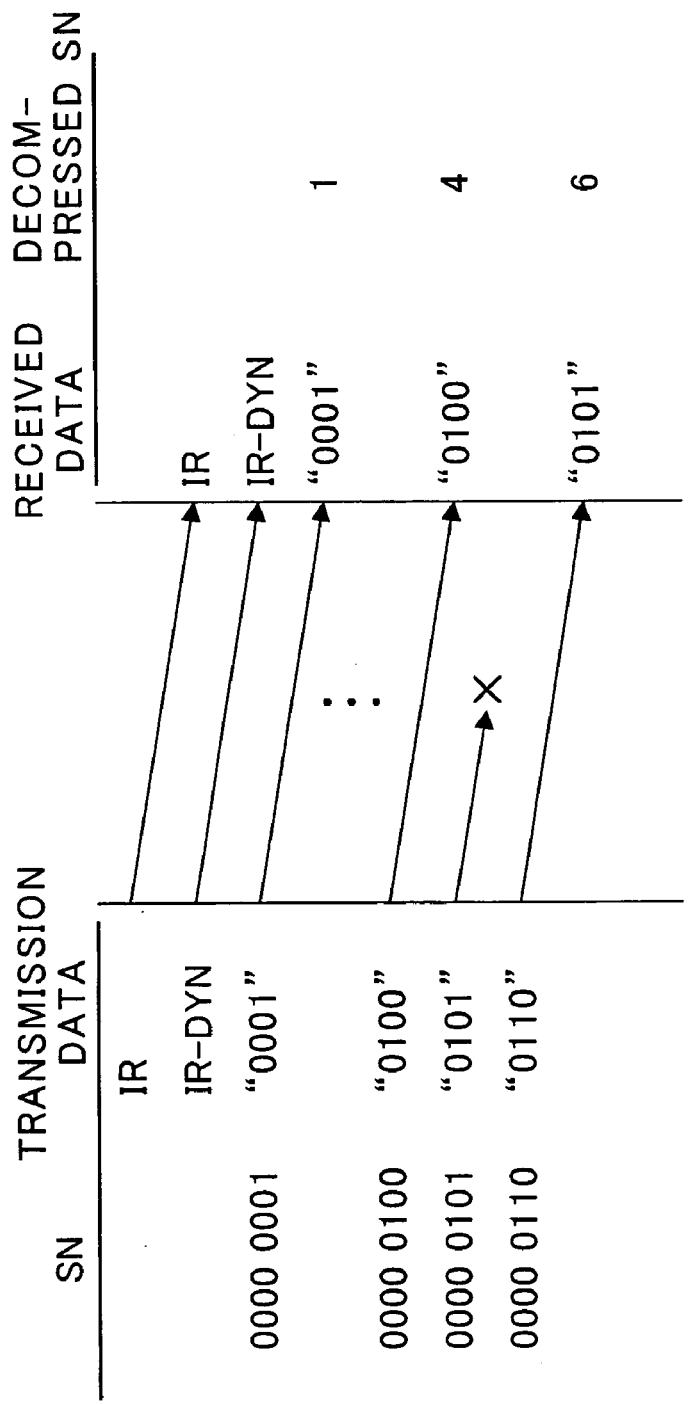
FIG. 4 is a sequence diagram to explain a state where a transmission error does not propagate when the transmission error occurs in data transmission in robust header compression.
Figure 5:
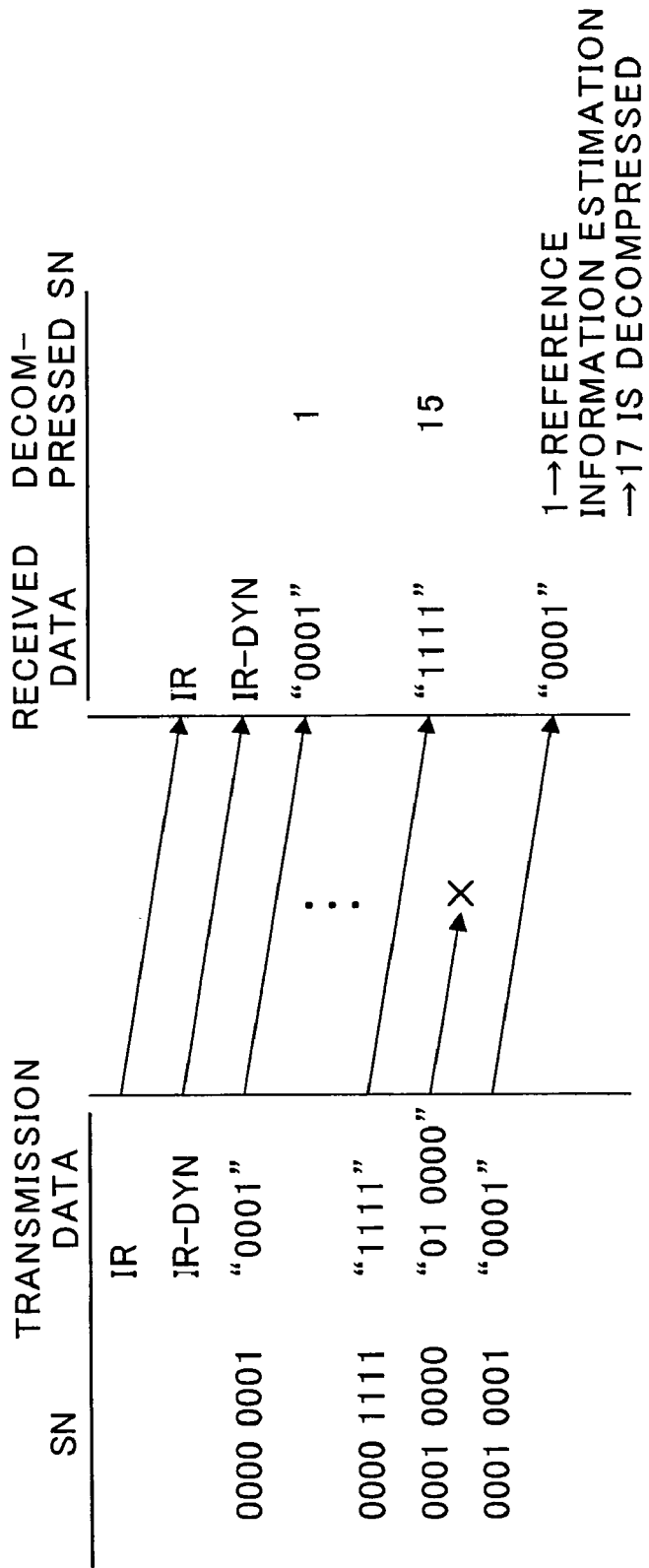
FIG. 5 is a sequence diagram to explain a state where a transmission error propagates when the transmission error occurs in data transmission in robust header compression.
Figure 6:
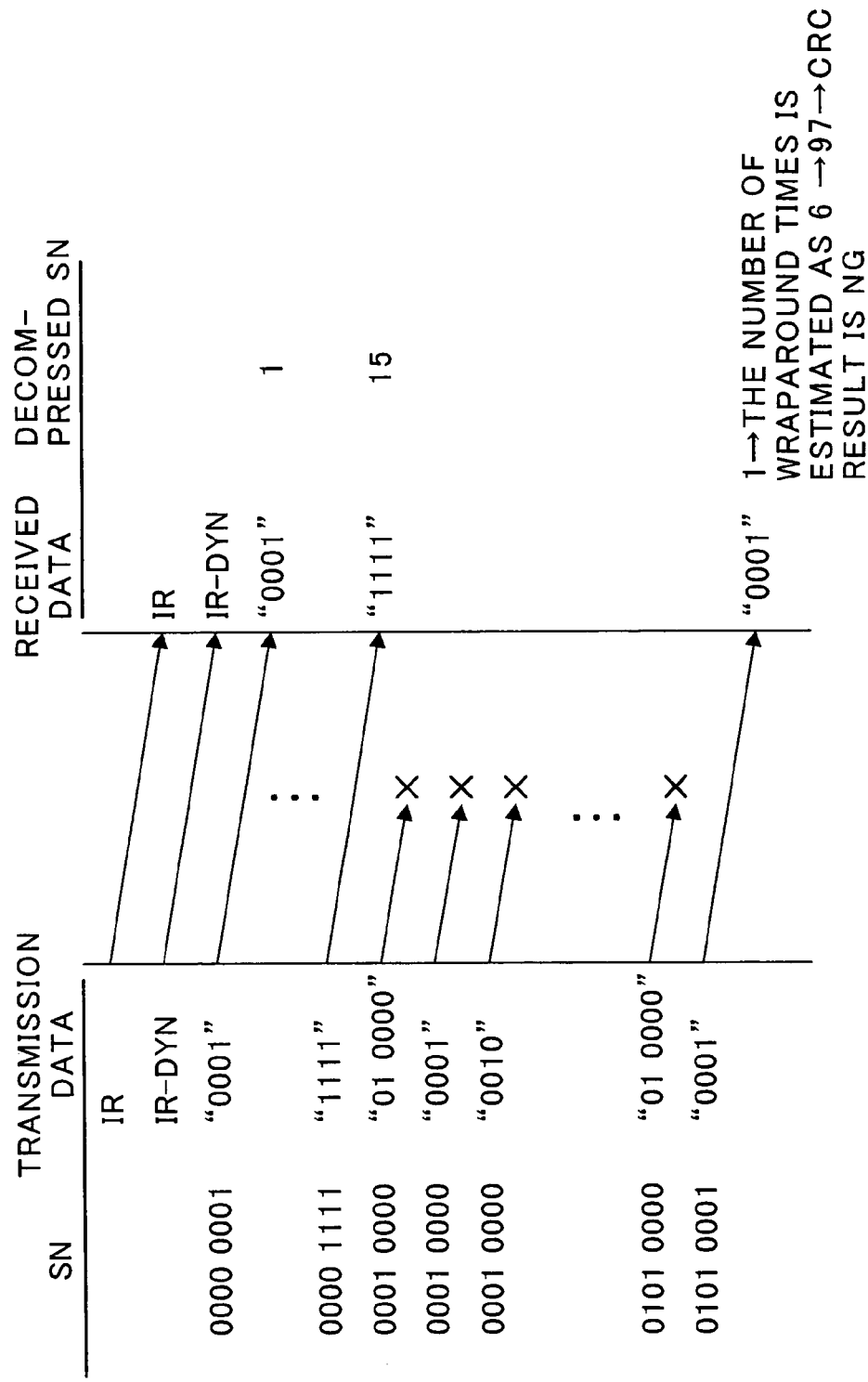
FIG. 6 is a sequence diagram to explain a state where packets are lost successively when a transmission error occurs in data transmission in robust header compression.
Figure 7:
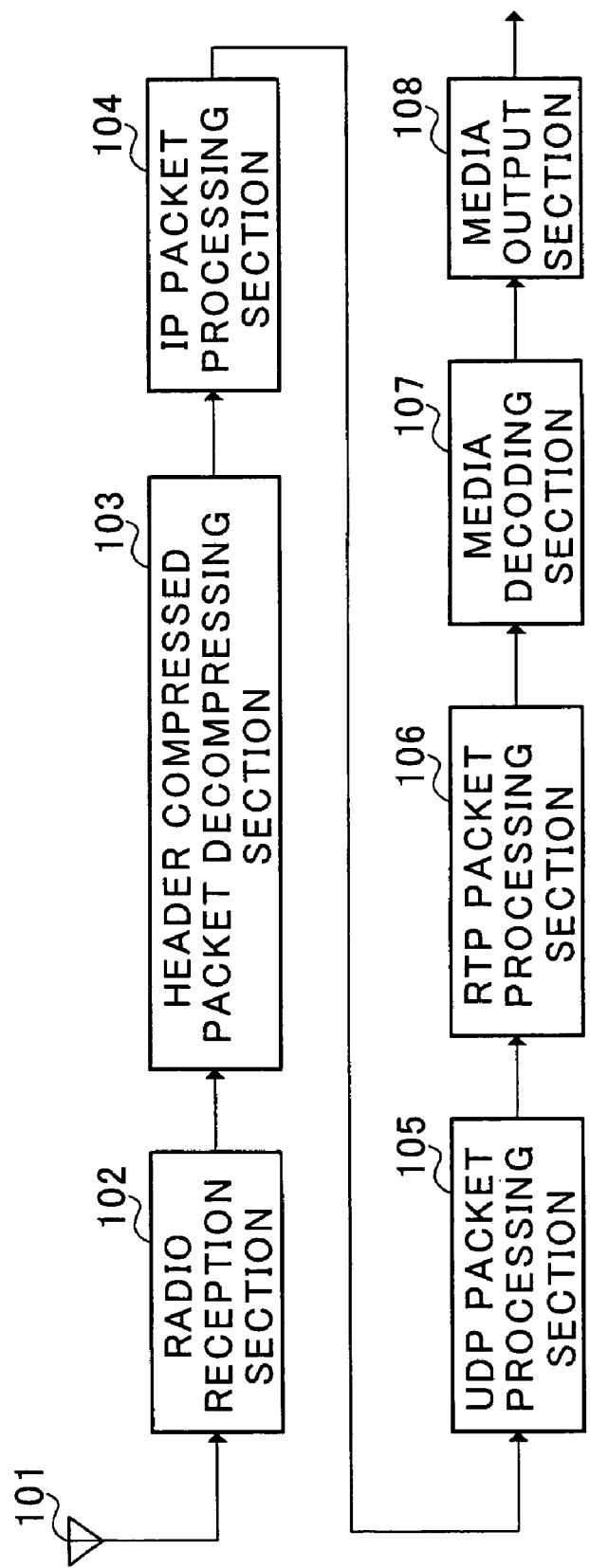
FIG. 7 is a block diagram illustrating a configuration of a radio communication apparatus provided with a header compressed packet receiving apparatus according to one embodiment of the present invention.
Figure 8:
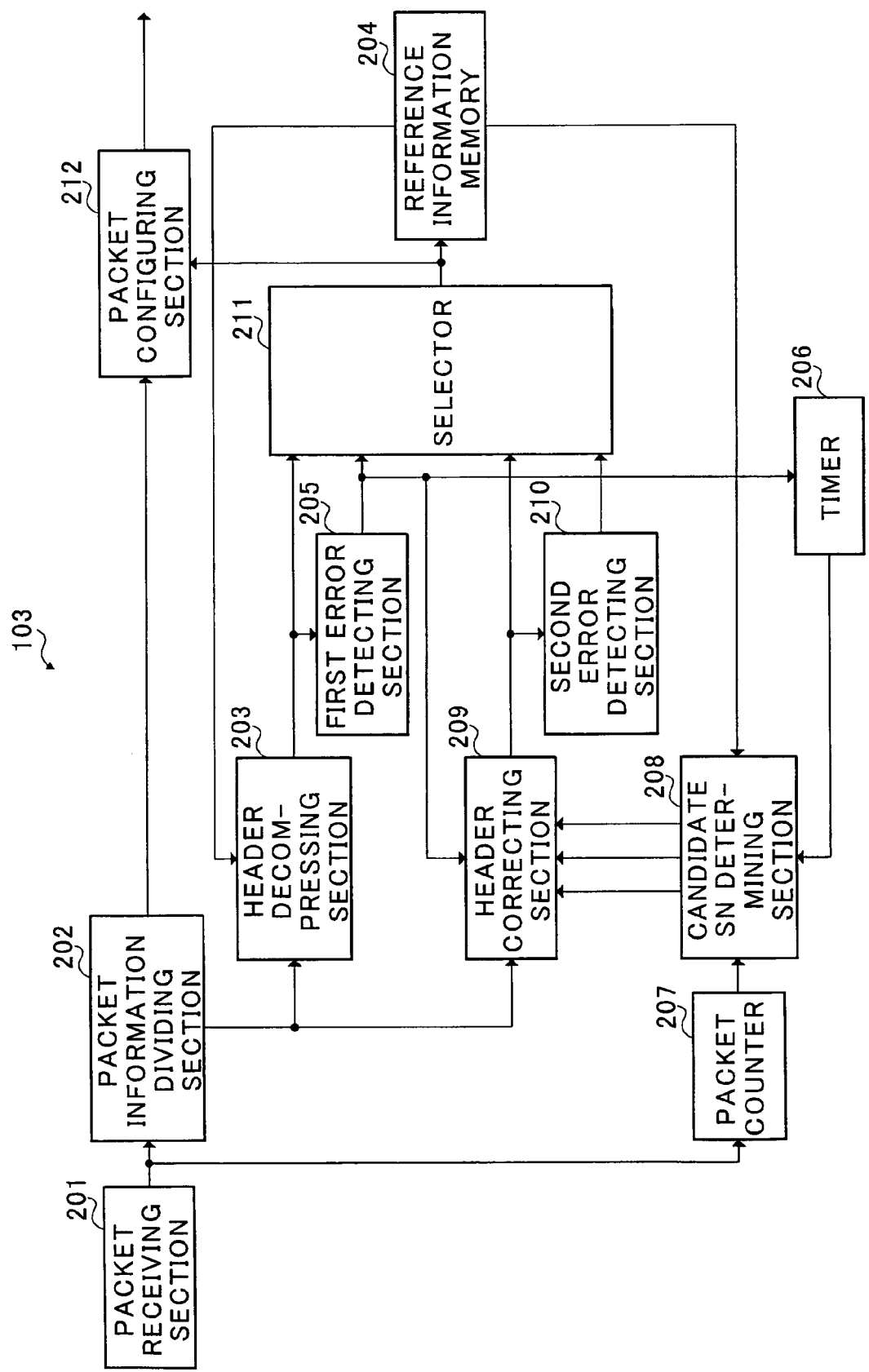
FIG. 8 is a block diagram illustrating a configuration of the header compressed receiving apparatus according to the one embodiment of the present invention.

(First Embodiment) FIG. 7 is a block diagram illustrating a configuration of a radio communication apparatus provided with a header compressed packet receiving apparatus according to this embodiment of the present invention. FIG. 8 is a block diagram illustrating a configuration of the header compressed receiving apparatus according to this embodiment of the present invention.

While FIG. 7 illustrates only a configuration as a receiving side of the radio communication apparatus for the explanation, it is assumed that the apparatus has a configuration as a transmitting side.

A radio signal transmitted from an apparatus of a transmitting side is received in radio reception section 102 via antenna 101. Radio reception section 102 performs predetermined radio reception processing (for example, such as downconverting, A/D conversion and demodulation) on the radio signal, and outputs packet data (demodulated packet data) subjected to the radio reception processing to header compressed packet decompressing section 103.

The packet data includes compressed header information, and header compressed packet decompressing section 103 decompresses the header information. The packet data with decompressed header information is output to IP packet processing section 104. IP packet processing section 104 extracts a UDP packet according to an IP header of the decompressed header information. The UDP packet is output to UDP packet processing section 105.

UDP packet processing section 105 extracts an RTP packet from the UDP packet. The RTP packet is output to RTP packet processing section 106. RTP packet processing section 106 extracts media data from the RTP packet. The media data is output to media decoding section 107.

Media decoding section 107 performs decoding corresponding to media on the media data. Since the media data is coded speech data and/or image data, when the media data is coded speech data, speech data decoding is performed, and image data decoding is performed when the media data is coded image data. The decoded media data is output to media output section 108. Media output section 108 reproduces the media data using an appropriate device (such as a speaker and monitor).

Header compressed packet decompressing section 103 has packet receiving section 201 that receives packet data, packet information dividing section 202 that divides the packet data into a payload portion and header portion, header decompressing section 203 that decompresses the compressed header, first error detecting section 205 and second error detecting section 210 that detect whether a decompressed header has an error, header correcting section 209 that corrects a header in which an error is detected, candidate SN determining section 208 that determines candidate sequence (SN) numbers from an elapsed time, packet receiving interval and reference information, selector 211 that outputs a header according to an error detection result, reference information memory 204 that stores the reference information, packet counter 207 that counts the number of packets received per unit time, timer 206, and packet configuring section 212 that configures a packet using the header portion and payload portion.

The operation of the header compressed packet receiving apparatus with the above configuration will be described below.

A packet received in packet receiving section 201 in header compressed packet decompressing section 103 is divided into a payload portion and header portion in packet information dividing section 202. Header decompressing section 203 decompresses the header using the compressed header information and the latest reference information stored in reference information memory 204. The decompressed header is output to first error detecting section 205 with an error detecting code added to the compressed header.

First error detecting section 205 determines whether or not the decompressed header has an error using the error detecting code, and outputs the result to selector 211. When an error is detected, the header is output to header correcting section 209 so as to correct the header.

Herein, header correction will be described. The header correction is performed by determining the number of candidate headers corresponding to the elapsed time between a last received correct packet and a received current packet, and performing error detection on each of the candidate headers. When a correct header is obtained, the header is output to selector 211.

Specifically, when first error detecting section 205 detects an error, the detection result is output to selector 211 and timer 206. Timer 206 outputs an elapsed time to candidate SN determining section 208. Further, when the detection result in first error detecting section 205 is correct, time 206 resets the elapsed time. Therefore, an output of timer 206 when an error is detected is equal to the elapsed time.

Meanwhile, the packet data output from packet receiving section 201 is output to packet counter 207. Packet counter 207 counts the number of packets received per unit time. Then, packet counter 207 outputs a packet receiving interval obtained from the number of packets received per unit time to candidate SN determining section 208.

Candidate SN determining section 208 determines candidate sequence numbers from the elapsed time from timer 206, packet receiving interval from packet counter 207 and reference information from reference information memory 204. The method of determining sequence numbers will be described later specifically.

In the above descriptions, assuming the packet type for transmitting insignificant 4 bits, the wraparound occurs once every 16 packets. Accordingly, from the elapsed time and packet receiving interval, it is possible to obtain the number of packets received during the elapsed time. Dividing the number of packets by 16 (the number of packets during which the wraparound occurs once) calculates the number of times the wraparound has occurred.

Next, assuming a case where an error occurs at a predetermined rate during the packet receiving interval, the number of wraparound times is calculated using the packet receiving interval including the error. As an example, a case of including the error of 10% is assumed. The numbers of wraparound times are calculated from 10% decreased and increased packet receiving intervals. The number of candidates is obtained from a difference between the numbers and the number of wraparound times calculated from the packet receiving interval with no error.

Descriptions are given using equations. Assuming an elapsed time is T (ms), packet receiving interval is Pt (ms), and the number of wraparound times calculated using the error of +10% or −10% with respect to Pt is respectively W+ or W−:

$$W+ = int(T/(1.1 \times Pt \times 16))$$

$$W- = int(T/(0.9 \times Pt \times 16))$$

Accordingly, the number of candidate sequence numbers is (W−)−(W+)+1. Then, assuming the sequence number in reference information memory 204 is RefSN and a candidate sequence number is CanSN(n), following equations are obtained:

$$CanSN(1) = RefSN + ((W+) << 4)$$

$$CanSN(2) = RefSN + ((W+)+1) << 4)$$

$$CanSN(n) = RefSN + ((W-) << 4)$$

$$(n = ((W-)-(W+)+1))$$

While the above-mentioned example describes the case of the error of 10%, an error may be determined corresponding to characteristics of the network actually, and the present invention is not limited particularly in determining the error.

Specifically, when the elapsed time is 1 second and the packet receiving interval is 10 ms, $$W+ = int(1000/(1.1 \times 10 \times 16))$$
$$= int(5.68) = 5$$
$$W- = int(1000/(0.9 \times 10 \times 16))$$
$$= int(6.94) = 6$$

Herein, when SN in reference information memory 204 is 15, following equations are obtained:

$$CanSN(1) = 15 + 5 << 4 = 85$$

$$CanSN(2) = 15 + 6 << 4 = 111$$

Accordingly, candidate SN determining section 208 outputs the above values to header correcting section 209. Header correcting section 209 decompresses and corrects the header using part of SN of the received compressed header and the candidate sequence numbers, and outputs the decompressed header to second error detecting section 210. Second error detecting section 210 performs error detection on the decompressed header. The error detection result is output to selector 211.

The error detection processing is performed corresponding to the number of candidates determined in candidate SN determining section 208. When the detection result in first error detecting section 205 is good, selector 211 outputs the header obtained in header decompressing section 203 to packet configuring section 212 and to reference information memory 204.

When the detection results in first error detecting section 205 are NG and there is only one result with no error among detection results obtained in second error detecting section 210, the header with no error is output to packet configuring section 212 and to reference information memory 204. Meanwhile, when all the detection results obtained in second error detecting section 210 are NG, any data is not output to packet configuring section 212 and reference information memory 204. Similarly, also when a plurality of detection results is good (a plurality of headers has no error) among the detection results obtained in second error detecting section 210, any data is not output to packet configuring section 212 and reference information memory 204.

Packet configuring section 212 combines the header information output from selector 211 and the payload data to obtain packet data, and outputs the packet data to IP packet processing section 104. The header information output from selector 211 is stored in reference information memory 204.

In this way, in header compressed packet reception according to this embodiment, the number of candidate sequence numbers is at least one which is used in correction when a transmission error occurs. The number of candidate sequence numbers is determined based on a packet receiving interval. Therefore, corresponding to the packet receiving interval, the number of candidate sequence numbers used in correction varies. Accordingly, even when the packet receiving interval varies and an elapsed time is increased, the number of candidate sequence numbers used in correction is increased corresponding to the interval, and it is thereby possible to increase the possibility of decompressing a received packet correctly and to suppress the number of discarded packets.

Further, the number of candidates is determined corresponding to the elapsed time, the number of candidate sequence numbers used in correction thus varies, and it is possible to suppress increases in redundant processing amount for header correction.

The header compressed packet receiving apparatus according to the present invention is capable of being mounted on a communication terminal apparatus such as a radio reception terminal apparatus and radio transmission/reception terminal apparatus. It is thereby possible to improve reception performance in transmission of header compressed packet.

The present invention is not limited to the above-mentioned embodiment, and capable of being carried into practice with various modifications thereof. For example, specific numerals used in the above-mentioned embodiment are not limited thereto, and capable of being carried into practice with various modifications thereof.

Further, while the above-mentioned embodiment describes the present invention as an apparatus of receiving header compressed packets, the present invention maybe implemented by software. In other words, it may be possible that a program of implementing the method of the present invention is stored in a writable storage medium such as a ROM, and the stored program is processed by a CPU. Furthermore, it may be possible to read the software from the storage medium to implement in a computer. Configuring the header compressed packet receiving apparatus of the present invention by software delivers the same effectiveness as that in the apparatus configured by hardware. Moreover, it is made possible to readily achieve the method of receiving header compressed packets as described above by microcomputer and personal computer.

The above-mentioned embodiment describes the case of providing the first error detecting section that detects an error of a header subjected to header decompression and the second error detecting section that detects an error of a header subjected to header correction. However, it may be possible to configure a section that serves as the first and second error detecting sections. It is thereby possible to reduce the hardware size.

As is apparent from the foregoing, according to the present invention, in techniques of receiving header compressed packets, one or more candidate sequence numbers used in correction are determined when a transmission error occurs, and it is thereby possible to increase the possibility of decompressing a received packet correctly. Further, the number of candidates is determined corresponding to an elapsed time, and it is thereby possible to suppress increases in redundant processing amount for header correction.

This application is based on the Japanese Patent Application No. 2001-301846 filed on Sep. 28, 2001, entire content of which is expressly incorporated by reference herein.

INDUSTRIAL APPLICABILITY

The present invention relates to a header compressed packet receiving apparatus and method, and more particularly, is suitable for use in a header compressed packet receiving apparatus and method in techniques for compressing header information assigned in each protocol to transmit in transmitting transmission data using a plurality of transmission protocols.

The invention claimed is:

1. A header compressed packet receiving apparatus comprising:
    a receiving section that receives a packet with a compressed header containing part of a sequence number;
    a header decompressing section that decompresses compressed header information to obtain original header information using the compressed header information and reference information beforehand received;
    an error detecting section that detects an error of a sequence number in a decompressed header;
    a candidate sequence number determining section that determines at least one candidate sequence number used in correcting a header, corresponding to the part of the sequence number contained in the compressed header, a time that elapses between previously receiving a packet correctly and receiving a current packet, and a packet receiving interval determined from the number of received packets per unit time when an error is detected in a sequence number; and
    a header correcting section that decompresses and corrects a header in which the error is detected using the candidate sequence number determined in the candidate sequence number determining section.

2. The header compressed packet receiving apparatus according to claim 1, wherein the candidate sequence number determining section calculates the number of wraparounds for a case with no error using the elapsed time and the packet receiving interval, calculates the number of wraparounds for a case with an error using the elapsed time and the packet receiving interval with an error, and determines a same number of candidate sequence numbers as a difference between the number of wraparounds for the case with no error and the number of wraparounds for the case with an error.

3. The header compressed packet receiving apparatus according to claim 1, wherein the error detecting section detects an error of the header corrected in the header correcting section.

4. A communication terminal apparatus having a header compressed packet receiving apparatus, the header compressed packet receiving apparatus comprising:
    a receiving section that receives a packet with a compressed header containing part of a sequence number;
    a header decompressing section that decompresses compressed header information to obtain original header information from the compressed header information and reference information beforehand received;
    an error detecting section that detects an error of a sequence number in a decompressed header;
    a candidate sequence number determining section that determines at least one candidate sequence number used in correcting a header, corresponding to the part of the sequence number contained in the compressed header, a time that elapses between previously receiving a packet correctly and receiving a current packet, and a packet receiving interval determined from the number of received packets per unit time when an error is detected in a sequence number; and
    a header correcting section that decompresses and corrects a header in which the error is detected using the candidate sequence number determined in the candidate sequence number determining section.

5. A header compressed packet receiving method comprising:
    receiving a packet with a compressed header containing part of a sequence number;
    decompressing compressed header information to obtain original header information using the compressed header information and reference information beforehand received;
    detecting an error of a sequence number in a decompressed header;
    determining at least one candidate sequence number used in correcting a header, corresponding to the part of the sequence number contained in the compressed header, a time that elapses between previously receiving a packet correctly and receiving a current packet, and a packet receiving interval determined from the number of received packets per unit time when an error is detected in a sequence number; and
    decompressing a header in which the error is detected using the determined candidate sequence number.

6. The header compressed packet receiving method according to claim 5, wherein determining the candidate sequence number comprises:
    calculating the number of wraparounds for a case with no error using the elapsed time and the packet receiving interval;
    calculating the number of wraparounds for a case with an error using the elapsed time and the packet receiving interval with an error; and
    determining a same number of candidate sequence numbers as a difference between the number of wraparounds for the case with no error and the number of wraparounds for the case with an error.

7. A header compressed packet receiving apparatus comprising:
    a receiving section that receives a packet with a compressed header containing part of a sequence number;
    a header decompressing section that decompresses compressed header information to obtain original header information from the compressed header information and reference information beforehand received;
    an error detecting section that detects an error of a sequence number in a decompressed header;
    a candidate sequence number determining section that calculates the number of wraparounds, corresponding to a time that elapses between previously receiving a packet correctly and receiving a current packet and a packet receiving interval, when an error is detected in a sequence number, and determines at least one candidate sequence number used in correcting a header based on the calculated number of wraparounds and the part of the sequence number contained in the compressed header; and a header correcting section that decompresses and corrects a header in which the error is detected using the candidate sequence number determined in the candidate sequence number determining section.

8. The header compressed packet receiving apparatus according to claim 7, wherein the candidate sequence number determining section calculates the number of wraparounds for a case with no error using the elapsed time and the packet receiving interval with no error, calculates the number of wraparounds for a case with an error using the elapsed time and the packet receiving interval with an error, and determines the candidate sequence number based on the number of wraparounds for the case with no error and the number of wraparounds for the case with an error.

9. The header compressed packet receiving apparatus according to claim 8, wherein the candidate sequence number determining section determines a same number of candidate sequence numbers as a difference between the number of wraparounds for the case with no error and the number of wraparounds for the case with an error.

10. A header compressed packet receiving method comprising:

receiving a packet with a compressed header containing part of a sequence number;

decompressing compressed header information to obtain original header information using the compressed header information and reference information beforehand received;

detecting an error of a sequence number in the decompressed header;

calculating the number of wraparounds corresponding to a time that elapses between previously receiving a packet correctly and receiving a current packet and a packet receiving interval, when an error is detected in a sequence number, determining at least one candidate sequence number used in correcting a header corresponding to the calculated number of wraparounds and the part of the sequence number contained in the compressed header; and decompressing a header in which the error is detected using the determined candidate sequence number.

11. The header compressed packet receiving method according to claim 10, wherein determining the candidate sequence number comprises:

calculating the number of wraparounds for a case with no error using the elapsed time and the packet receiving interval with no error;

calculating the number of wraparounds for a case with an error using the elapsed time and the packet receiving interval with an error; and determining a same number of candidate sequence numbers as a difference between the number of wraparounds for the case with no error and the number of wraparounds for the case with an error.

12. The header compressed packet receiving method according to claim 11, wherein determining the candidate sequence number comprises determining a same number of candidate sequence numbers as a difference between the number of wraparounds for the case with no error and the number of wraparounds for the case with an error.

* * * * *